(No Model.)

E. E. SCOTT.
SAFETY TRAP FOR DISCHARGE PIPES.

No. 419,717. Patented Jan. 21, 1890.

Witnesses:

Inventor:
Edward E. Scott

UNITED STATES PATENT OFFICE.

EDWARD E. SCOTT, OF EAST SAGINAW, MICHIGAN.

SAFETY-TRAP FOR DISCHARGE-PIPES.

SPECIFICATION forming part of Letters Patent No. 419,717, dated January 21, 1890.

Application filed May 9, 1889. Serial No. 310,209. (No model.)

*To all whom it may concern:*

Be it known that I, EDWARD E. SCOTT, of East Saginaw, in the county of Saginaw and State of Michigan, have invented certain new and useful Improvements in Traps for Discharge-Pipes from Sinks, Bath-Tubs, Wash-Basins, and the like; and I do hereby declare the following to be a full, clear, and exact description of the invention, such as will enable others skilled in the art to which it pertains to make and use it, reference being had to the accompanying drawings, which form part of this specification.

This invention, as stated, relates to traps for discharge-pipes from sinks, bath-tubs, wash-basins, and the like, to prevent the escape therefrom of sewer-gas; and it consists in a novel construction thereof whereby a direct pressure is secured from the inlet to the outlet thereof without any obstructions or sharp turns, thus obviating any chance for the lodgment of sediment or the collection of lint or other substances to obstruct the passage, and the outlet is perfectly sealed by the rubber or metal ball adapted to that purpose against the escape of sewer-gas into the trap and the pipes above, and it becomes impossible to siphon the trap; but whether the trap contains water or not the trap will be perfectly sealed by the ball.

The object of my invention is to make a trap which will clear itself of all sediment, reduce the possibility of its becoming clogged or stopped up by foreign matter to the minimum, clear itself by the action of the water upon its unobstructed surfaces, allowing the water to pass out under the ball used for sealing the outlet, thus avoiding the possibility of the mouth of the outlet becoming closed by the accumulation of dirt on top of the ball, and affording sufficient air-space above the water in the trap to reduce the liability of its freezing, at the same time allowing the water to more thoroughly cleanse and free that part of the trap.

Figure 1:
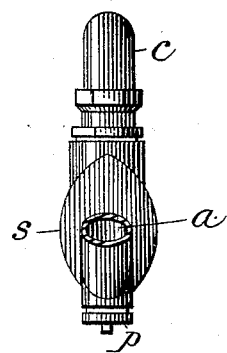
Figure 2:
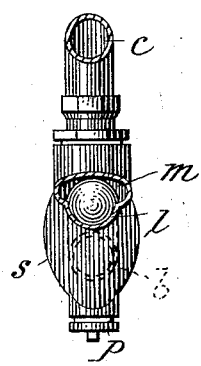
Figure 3:
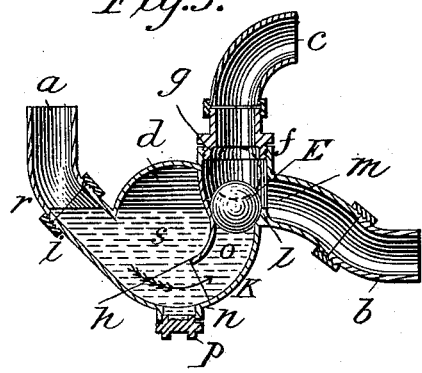

In the accompanying drawings, Figure 1 represents an end view of the trap from the direction of the inlet *a*, showing a sectional view of the latter. Fig. 2 is a view of the same from the opposite direction, showing a sectional view of the mouth of the same *m* and the oblong form thereof, as also the lip *l*, projecting into the mouth to prevent the ball E from entering the outlet *b*, and to prevent also sediment from falling back into the trap and to allow a free drainage and vent of the ball-chamber *g*. Fig. 3 is a longitudinal section of the trap.

The same letter refers to like parts in each figure.

Traps constructed hitherto have been found to clog and fill up easily with sediment and refuse matter, and in those closing the outlet with the ball device it has been found that the tendency was to fill over the top of the ball with such matter and retard its workings and even completely prevent its operation, and at times the ball-chamber has been found to fill up to such an extent as to prevent the ball from settling into its seat. It has been found also that the outlet of other traps projects so far into the body of the trap as to allow the sediment to miss the outlet and clog above the outlet or around the inlet, stopping the trap by constant accretions.

In my invention I have obviated the first objection by so forming the inlet *a* and outlet *b* as to allow a direct pressure of the water through the body of the trap, which is free from abrupt bends and projections, and providing the air-space *d*, thereby allowing the trap to be thoroughly cleansed whenever flushed, and carrying refuse matter up under the ball E into the outlet, which is provided at the mouth with the lip *l* to catch the sediment and prevent its falling back into the trap.

I obviate the second objection by arranging the mouth *m* of the outlet *b* so that the ball E is raised by the pressure of the water when flushed into the top of the ball-chamber *g*, allowing the water and sediment to escape under it through the mouth *m* into the outlet *b*, and avoiding any possibility of the ball becoming lodged by the accumulation above it of foreign substances, while by the use of the lip *l*, projecting into the mouth *m* of the outlet *b*, and forming a part of the seat of the ball when the trap is closed, I prevent such accumulations in the seat of the ball. By making the inlet and outlet on the same angle, and making the bottom of the trap of the same size as inlet and outlet pipes, and making the body of the trap oval and without obstructions and leaving the air-chamber $d$ above the water in the trap, the trap is necessarily cleansed in every part with each flush of water, and the revolution of the ball E with each pressure keeps the ball-chamber $g$ free from sediment.

I obviate the third objection by providing my trap with an inlet entering at a suitable angle, preferably that of forty-five degrees, and making the outer edge and bottom of the trap substantially a continuance of the lower half of the inlet-pipe to the lip $h$. Thence the pipe is continued entire, and I thereby confine the water and refuse from the inlet within such a space as to cause a direct pressure from the inlet-pipe $a$ to the outlet-pipe $b$, and cause all sediment to be carried up out of the bottom of the trap with each discharge and over the lip $l$ into the outlet $b$.

My trap may be made of any suitable metal, and the ball may be of suitable metal or rubber.

What I claim as my invention is—

1. A safety-trap of circular form, the upper and lower outer edges forming an arc of a small circle with sides convex, the inlet $a$ entering well toward the top of the trap, and the outer edge of the trap from the point of its entry at $r$ to the mouth of the outlet at $m$, being in form and appearance a continuance of the lower part of the discharge-pipe, the pipe $o$, extending on the arc of a circle from well toward the bottom of the trap and being sealed at the top by the ball E, all substantially as and for the intents and purposes hereinbefore described.

2. A safety-trap of circular form having its greatest diameter in a vertical plane drawn through the center thereof from $r$ to $m$, its sides convex, forming over the water-trap S the air-chamber $d$, the inlet-pipe $a$ entering near the top of the trap at $r$, and from thence to the outlet at $m$, the ends and bottom of the trap being in effect a continuance of the lower part of the discharge-pipe on the arc of a small circle, the lip $h$, forming the inner part of the pipe $o$, projecting toward the bottom of the trap, its top forming the seat of the ball E, and the outer half thereof forming the lip $l$ and having the ball-chamber $g$ with ball E, and oblong mouth $m$ of outlet $b$, all substantially as and for the intents and purposes set forth.

EDWARD E. SCOTT.

Witnesses:
WM. G. GAGE,
MATE E. PERRY.